United States Patent
Sreedhar et al.

(10) Patent No.: US 9,740,659 B2
(45) Date of Patent: Aug. 22, 2017

(54) MERGING AND SORTING ARRAYS ON AN SIMD PROCESSOR

(71) Applicant: International Business Machines Corporation, Armonk, NY (US)

(72) Inventors: Dheeraj Sreedhar, Bangalore (IN); Robert Montoye, Yorktown Heights, NY (US); Jeffrey H. Derby, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 14/219,391

(22) Filed: Mar. 19, 2014

(65) Prior Publication Data

US 2015/0269119 A1   Sep. 24, 2015

(51) Int. Cl.
| | |
|---|---|
| G06F 15/80 | (2006.01) |
| G06F 9/302 | (2006.01) |
| G06F 9/305 | (2006.01) |
| G06F 9/315 | (2006.01) |
| G06F 9/30 | (2006.01) |
| G06F 7/36 | (2006.01) |

(52) U.S. Cl.
CPC ...... *G06F 15/8015* (2013.01); *G06F 9/30021* (2013.01); *G06F 9/30036* (2013.01); *G06F 7/36* (2013.01); *G06F 15/8053* (2013.01); *G06F 15/8092* (2013.01)

(58) Field of Classification Search
CPC ........... G06F 15/8007; G06F 15/80015; G06F 15/8023; G06F 9/30021; G06F 9/30032; G06F 9/30036; G06F 15/8053; G06F 15/8092; G06F 7/36

USPC .................. 712/21, 22, 300, 2–9, 221, 223
See application file for complete search history.

(56) References Cited

U.S. PATENT DOCUMENTS

| | | | |
|---|---|---|---|
| 8,261,043 B2 | 9/2012 | Inoue et al. | |
| 2007/0156685 A1* | 7/2007 | Inoue | ........................ G06F 7/36 |
| 2007/0240224 A1* | 10/2007 | Agrawal | ........... G06F 17/30445 |
| | | | 726/25 |
| 2008/0316214 A1* | 12/2008 | Peeper | .................. G06T 15/005 |
| | | | 345/501 |
| 2011/0066806 A1 | 3/2011 | Chhugani et al. | |
| 2013/0042092 A1 | 2/2013 | Inoue et al. | |

OTHER PUBLICATIONS

Chhugani et al. Efficient Implementation of Sorting on Multi-Core SIMD CPU Architectures, VLDB, 2008.
Inoue et al. AA-Sort: A New Parallel Sorting Algorithm for Multi-Core SIMD Processors, in PACT'07, pp. 189-198, 2007.
K.E. Batcher, Sorting Networks and their Applications, in Spring Joint Computer Conference, 1968.

* cited by examiner

*Primary Examiner* — Daniel Pan
(74) *Attorney, Agent, or Firm* — Ryan, Mason & Lewis, LLP

(57) ABSTRACT

Methods, systems, and articles of manufacture for merging and sorting arrays on a processor are provided herein. A method includes splitting an input array into multiple sub-arrays across multiple processing elements; merging the multiple sub-arrays into multiple vectors; and sorting the multiple vectors by comparing and swapping one or more vector elements among the multiple vectors.

20 Claims, 7 Drawing Sheets

MERGING AND SORTING ARRAYS ON AN SIMD PROCESSOR

FIELD OF THE INVENTION

Embodiments of the invention generally relate to information technology, and, more particularly, to merging and sorting techniques.

BACKGROUND

Sorting and merging of sorted arrays is a common computing operation in a variety of applications pertaining to contexts such as databases, cognitive computing, graph searching, and speech recognition. An efficient sorting and merging kernel is commonly critical to the performance of such applications, especially in instances wherein the arrays to be merged include as many as several trillion records.

Accordingly, a need exists for scalable techniques for merging and sorting arrays on a processor.

SUMMARY

In one aspect of the present invention, techniques for merging and sorting arrays on a processor are provided. An exemplary computer-implemented method can include steps of splitting an input array into multiple sub-arrays across multiple processing elements; merging the multiple sub-arrays into multiple vectors; and sorting the multiple vectors by comparing and swapping one or more vector elements among the multiple vectors.

In another aspect of the invention, an exemplary computer-implemented method can include steps of selecting a desired sub-array size based on one or more parameters; splitting an input array into multiple sub-arrays of the selected size across multiple simple instruction, multiple data (SIMD) lanes; merging the multiple simple instruction, multiple data (SIMD) lanes into multiple vectors; and sorting the multiple vectors based on a set of compare-swap instructions applied to the multiple vectors.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for merging and sorting arrays on an SIMD processor. At least one embodiment of the invention includes merging arrays across SIMD vectors as opposed to across SIMD lanes. For example, such an embodiment can include splitting an input sequence across SIMD lanes and merging SIMD lanes into vectors. Additionally, at least one embodiment of the invention includes sorting among vectors by comparing and swapping vector elements, as well as selecting the optimal block size for sorting and merging. As detailed herein, at least one embodiment of the invention is scalable with SIMD width.

Figure 1:
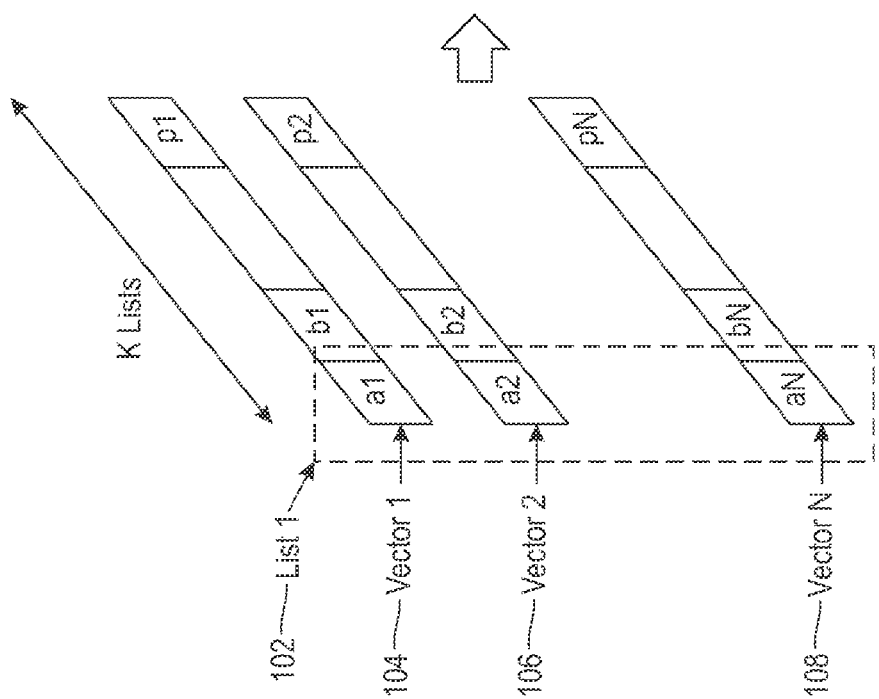
FIG. 1 is a diagram illustrating algorithm details, according to an embodiment of the present invention.

FIG. 1 is a diagram illustrating algorithm details, according to an embodiment of the present invention. By way of illustration, FIG. 1 depicts K lists including list 102 (also noted as List 1 in FIG. 1), vector 104 (also noted as Vector 1), vector 106 (also noted as Vector 2), and vector 108 (also noted as Vector N). Additionally, FIG. 1 depicts a sorting network 110, which is implemented as a sequence of vector-compare-swap instructions. It is to be noted that in contrast to existing approaches wherein the sorting network is implemented across SIMD lanes, in one or more embodiments of the invention, the sorting network 110 is implemented across vectors. As also illustrated, FIG. 1 depicts the K lists being input to the sorting network 110, which thereby outputs K sorted lists (which can include vectors 104', 106' and 108').

As shown in FIG. 1 and detailed further herein, at least one embodiment of the invention includes vectorization for both merge and sort operations. As used in FIG. 1, K represents the SIMD width. Also, it should be noted that the sorting network 110 depicted in FIG. 1 is merely a representative example, and that a sorting network of any order can be constructed in connection with one or more embodiments of the invention. Further, as described herein, it is to be noted that for a merging operation, the input can include a sorted bitonic sequence. For instance, FIG. 2 illustrates this concept using an N =4 example.

Figure 2:
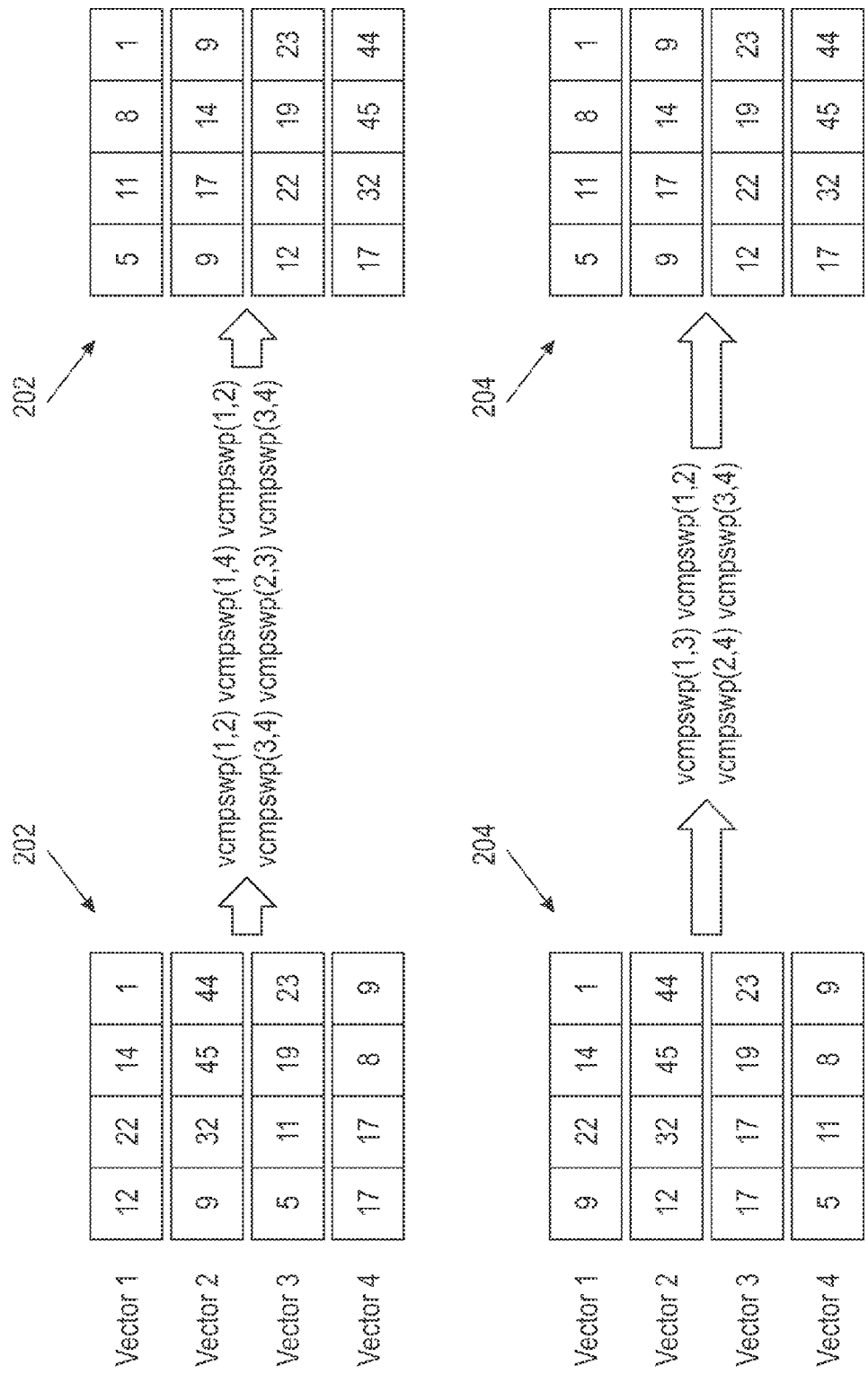
FIG. 2 is a diagram illustrating algorithm details, according to an embodiment of the invention.

FIG. 2 is a diagram illustrating algorithm details, according to an embodiment of the present invention. By way of illustration, FIG. 2 depicts a sort example 202 within the context of a bitonic network, wherein every SIMD lane of output is sorted in ascending order. Additionally, FIG. 2 also depicts a merge example 204 within the context of a bitonic network, wherein the input includes a bitonic sequence and every SIMD lane of output is merged. The merge operation merges two ascending ordered lists into a single ascending ordered list. Further, as denoted in FIG. 2, "vcmpswp" refers to a "vector compare swap" instruction.

Additionally, at least one embodiment of the invention can include using an odd-even network or a bitonic network. By way of example, the sorting network 110 depicted in FIG. 1 could be realized using an odd-even network or a bitonic network (concepts that are to be appreciated and understood by one skilled in the art). Sorting complexity for a bitonic network can be represented as: $(N/2)(\log N)(\log N+1)/2$. Sorting complexity for an odd-even network can be represented as: $(N/2)[2+(\log N)(\log N-1)/2-2/N]$. As such, networks encompass $O(N(\log N)^2)$ sorting complexity.

For a merge operation, an odd-even network can be constructed, which requires $(N/2)\log(N/2)+1$ compare-swap instructions. In at least one embodiment of the invention, the latency of compare-swap instructions can be covered by selecting a network width (N) according to the instruction latency (as further described herein).

Figure 3:
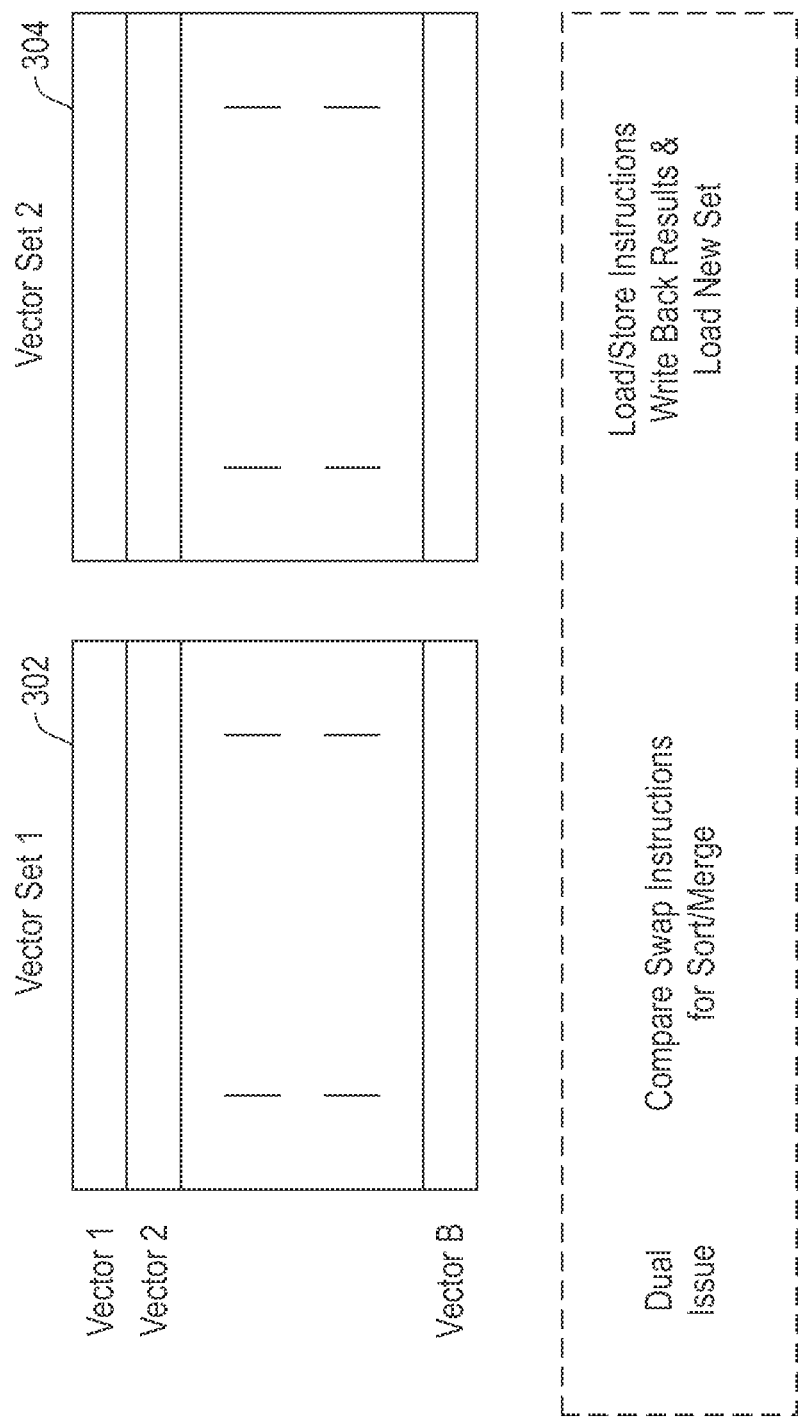
FIG. 3 is a diagram illustrating hiding memory access latency, according to an embodiment of the present invention.

FIG. 3 is a diagram illustrating hiding memory access latency, according to an embodiment of the present invention. By way of illustration, FIG. 3 depicts vector set 302 (also identified as Vector Set 1 in FIG. 3) and vector set 304 (also identified as Vector Set 2), each of which includes multiple vectors (such as, for example, Vector 1, Vector 2, Vector B, etc.). The time needed for loading one vector set is completely covered by the latency of vector compare instructions. Note that the vector compare instructions are issued on the same compute cycle as that of the load instruction (as noted via the dual issue notation in FIG. 3).

In connection with FIG. 3, one or more embodiments of the invention include loading and/or storing latency information to a set of registers from memory. Additionally, such loading and/or storing can be hidden or obfuscated by working on two sets of registers. In such an embodiment, compare-swap instructions for merging and/or sorting can be performed on one set of registers, and writing-back the results as well as loading the new set of instructions can be carried out on the second set of register files.

Figure 4:
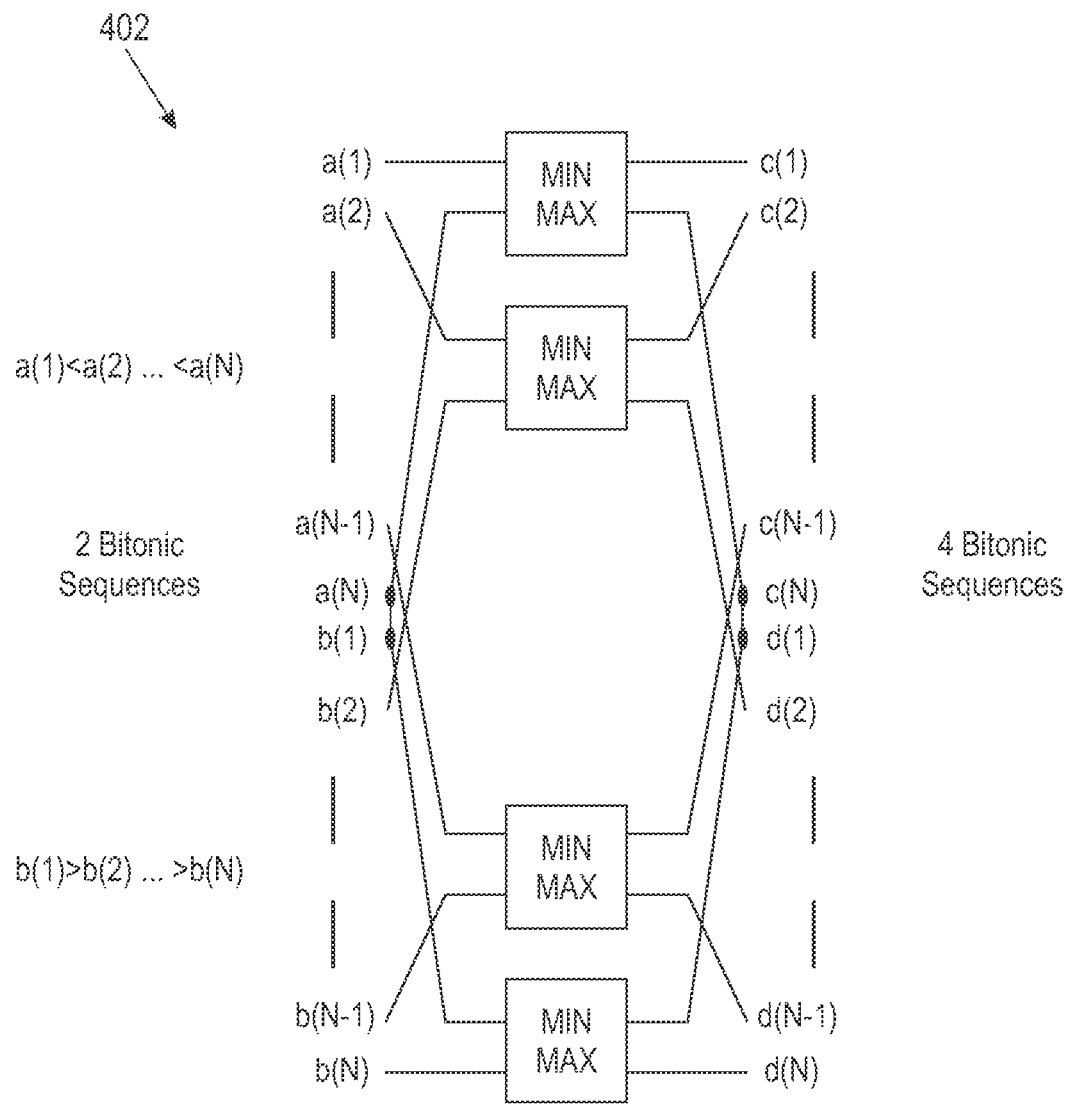
FIG. 4 is a diagram illustrating splitting an input into SIMD lanes, according to an embodiment of the present invention.

FIG. 4 is a diagram 402 illustrating splitting an input into SIMD lanes, according to an embodiment of the present invention. By way of illustration, FIG. 4 depicts splitting an input of two sorted lists into two bitonic lists. With respect to the noted splitting, two input sequences, a1 ... ,aN and b1 ... bN are fed to a min-max splitter as shown in FIG. 4. Additionally, $c_i=\min(a_i, b_i)$ and $d_i=\max(a_i, b_i)$, wherein $I=1 \ldots N$.

Figure 5:
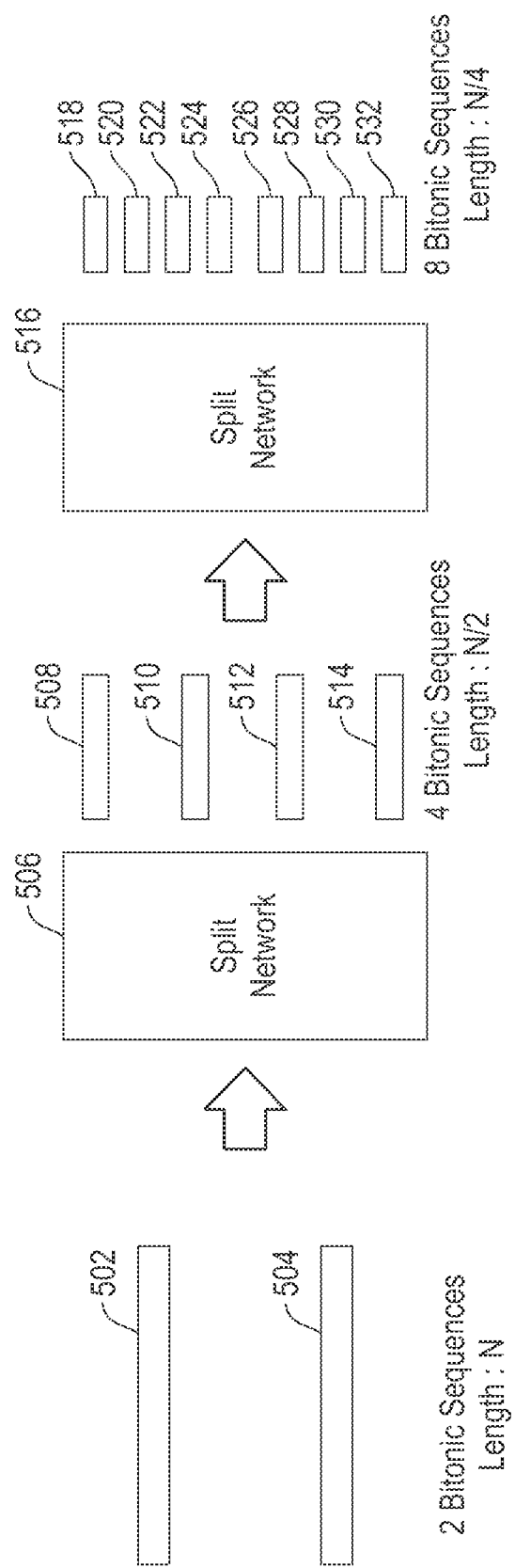
FIG. 5 is a diagram illustrating splitting an input into SIMD lanes, according to an embodiment of the invention.

FIG. 5 is a diagram illustrating splitting an input into SIMD lanes, according to an embodiment of the present invention. By way of illustration, FIG. 5 depicts input bitonic sequences 502 and 504, each having length N. FIG. 5 also depicts sequences 502 and 504 being provided as input to split network 506, which outputs four bitonic sequences 508, 510, 512 and 514, wherein each of said four sequences has a length of N/2. Further, FIG. 5 depicts sequences 508, 510, 512 and 514 being provided as input to split network 516, which outputs eight bitonic sequences 518, 520, 522, 524, 526, 528, 530 and 532, wherein each of these eight sequences has a length of N/4.

In accordance with the techniques detailed in FIG. 5, an aspect of the invention includes splitting input into any number of desired lanes. Additionally, as depicted in FIG. 5, the output is strictly bitonic. Also, in at least one embodiment of the invention, the output can be fed to a merge network, as depicted in FIG. 1. In such an embodiment, each of the output sequences in FIG. 5 can be provided as the input of FIG. 1 as a list. As such, the output of the merge network includes a fully sorted list. Further, as noted herein, at least one embodiment can include using an odd-even network instead of a bitonic network. Implementation of an odd-even network can result, for example, in fewer vector compare instructions than implementation of a bitonic network.

For a merge operation, the number of compare-swap instructions can be represented as $N \log N+1$, while the number of vector instructions to write-back and load is $2N$. Accordingly, memory access latency can be hidden if $N \log N+1>4N, N>16$. As noted in FIG. 5, at least one embodiment of the invention can include implementing a "dual issue" of the load/store instructions with the compare swap instructions (such as described above).

As detailed herein, at least one embodiment of the invention includes merging large arrays. By way of illustration, consider the following example description of such an embodiment. Assume that two sorted sequences of length $N_M$ can be merged with the available vector registers of width K. This requires $\log_2(K)$ steps of splitting, wherein the depth of the sorting network is $N_M/K$ each. Hence, this operation requires $$\frac{N_M}{K}\log_2\left(\frac{N_M}{K}\right)+1$$

compare-swap instructions.

Also, at least one embodiment of the invention includes selecting the block size ($N_M$) for a merge operation. Selection of block size can be based on an objective to cover the latency of a back-to-back issue of a vector compare-swap instruction. For example, for N=4, the sequence of instructions can include vcmpswp(1,2), (3,4) (1,4). Accordingly, in such an example, N=8 is sufficient to cover a latency of 4. As used herein, latency describes the number of cycles required to complete an instruction.

Also, selection of block size can be based on factors such as, for example, the maximum number of available vector registers, the minimum set of registers required to hide processing behind a memory transfer, and/or the efficiency of a merge operation.

Sorting and merging, in accordance with at least one embodiment of the invention, can be carried out as described below. The sorting of $N_s$ numbers using vectors of width K can include the following sequence of operations:
1. Load the $N_s$ numbers into $N_s/K$ vectors.
2. Sort the numbers in each SIMD lane using compare-swap instructions from an odd-even network. Thereafter, there are K sorted lists.
3. Binary-merge the K sorted lists into one list.

Figure 6:
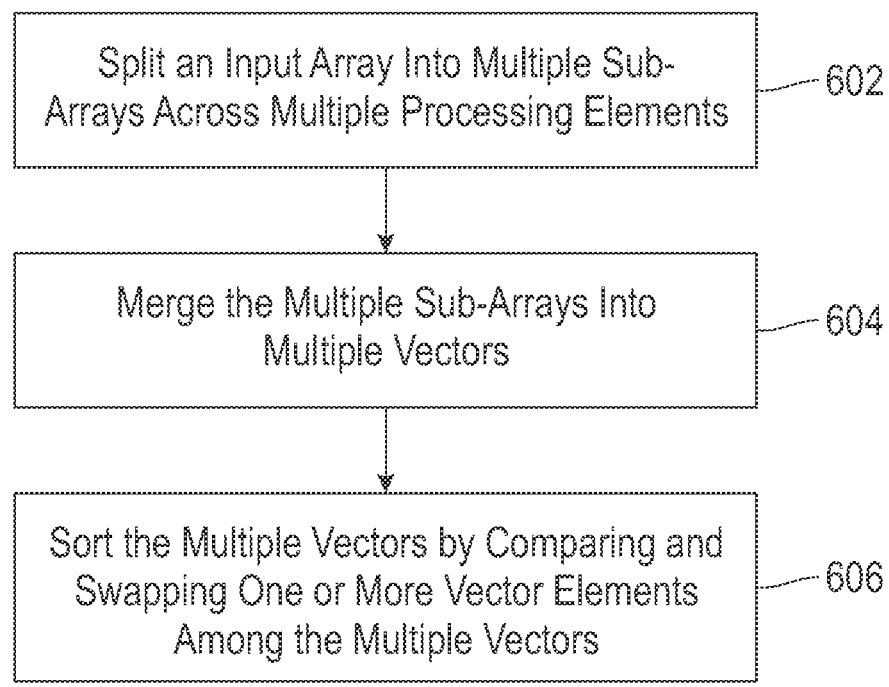
FIG. 6 is a flow diagram illustrating techniques according to an embodiment of the invention.

FIG. 6 is a flow diagram illustrating techniques according to an embodiment of the invention. Step 602 includes splitting an input array into multiple sub-arrays across multiple processing elements. In at least one embodiment of the invention, each of the multiple processing elements comprises a given width. Additionally, in an example embodiment of the invention, the above-noted splitting step can include splitting each SIMD lane (or sub-list) into multiple lists, such as depicted, for example, in FIG. 5.

Step 604 includes merging the multiple sub-arrays into multiple vectors. In at least one embodiment of the invention, the above-noted merging step can include merging lists such as depicted in component 204 of FIG. 2 with each list on an SIMD lane. Step 606 includes sorting the multiple vectors by comparing and swapping one or more vector elements among the multiple vectors. Sorting can include sorting the multiple vectors via an odd-even network or via a bitonic network, and applying the sorting network directly across the multiple vectors (as opposed to against the SIMD lanes).

As also detailed herein, the techniques depicted in FIG. 6 can additionally include arranging an array as multiple sub-lists on each SIMD lane and sorting each sub-list such as illustrated, for example in component 202 of FIG. 2.

The techniques depicted in FIG. 6 can also include selecting a sub-array size, wherein the selection can be based, for example, on a latency value, a capacity to hide vector load latency, and/or vector availability. Additionally, at least one embodiment of the invention includes splitting the input array into multiple sub-arrays of the selected sub-array size. Further, the techniques depicted in FIG. 6 can include generating compare-swap instructions for sorting, as well as storing the compare-swap instructions (for subsequent use, for example).

Additionally, as detailed herein, at least one embodiment of the invention can include selecting a desired sub-array size based on one or more parameters, splitting an input array into multiple sub-arrays of the selected size across multiple SIMD lanes, merging the multiple SIMD lanes into multiple vectors, and sorting the multiple vectors based on a set of compare-swap instructions applied to the multiple vectors. The one or more parameters can include, for example, a latency value and/or vector availability.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 7:
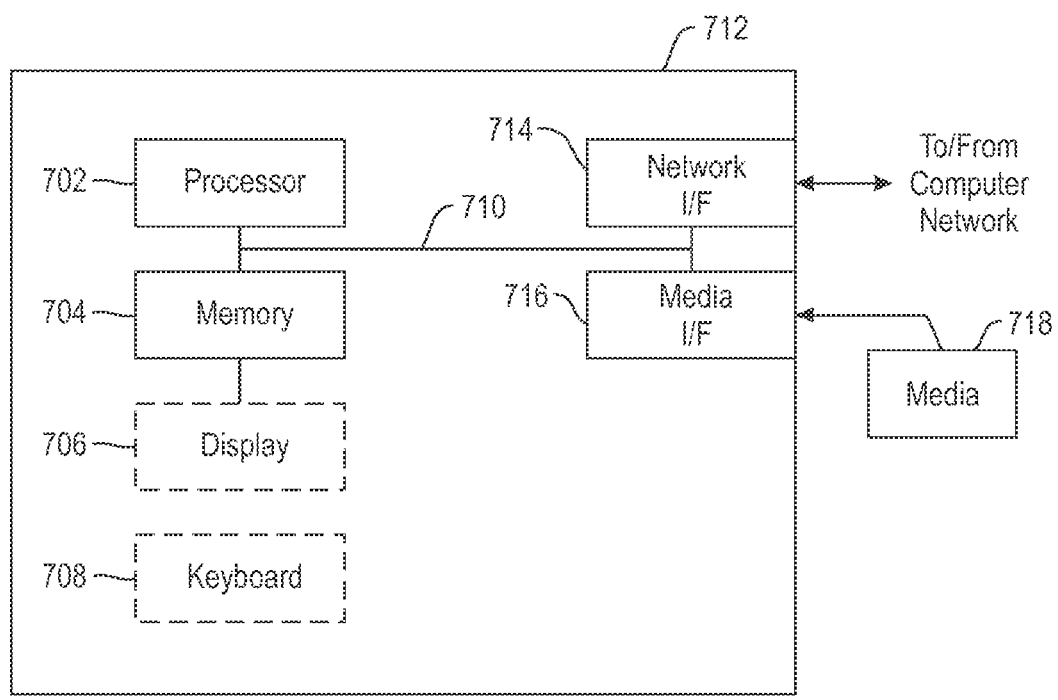
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar to programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or, combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, splitting an input sequence across SIMD lanes such that the sorting network can be used without the need for further merging.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   splitting an input array into multiple sub-arrays across multiple processing elements;
   merging the multiple sub-arrays into multiple vectors, wherein each of the multiple vectors contains one element from each of the multiple sub-arrays;
   sorting the multiple vectors by comparing and swapping one or more vector elements among the multiple vectors, wherein said comparing and said swapping comprises performing a set of compare-swap instructions on a first set of one or more registers, and wherein the number of compare-swap instructions in the set of compare-swap instructions is represented as NlogN+1, wherein N is a predetermined value; and
   writing-back results of said sorting on a second set of one or more registers;
   wherein said splitting, said merging, said sorting, and said writing-back are carried out by at least one computing device.

2. The method of claim 1, wherein said sorting comprises sorting the multiple vectors via an odd-even network.

3. The method of claim 2, comprising:
   applying the odd-even network directly across the multiple vectors.

4. The method of claim 1, wherein said sorting comprises sorting the multiple vectors via a bitonic network.

5. The method of claim 4, comprising:
   applying the bitonic network directly across the multiple vectors.

6. The method of claim 1, comprising:
   selecting a sub-array size.

7. The method of claim 6, wherein said splitting comprises splitting the input array into multiple sub-arrays of the selected sub-array size.

8. The method of claim 6, wherein said selecting comprises selecting the sub-array size based on a latency value.

9. The method of claim 6, wherein said selecting comprises selecting the sub-array size based on a capacity to hide vector load latency.

10. The method of claim 1, wherein each of said multiple processing elements comprises a given width.

11. The method of claim 1, comprising:
    generating the set of compare-swap instructions for said sorting.

12. A computer program product, the computer program product comprising a computer readable storage medium having program instructions embodied therewith, the program instructions executable by a computing device to cause the computing device to:
    split an input array into multiple sub-arrays across multiple processing elements;
    merge the multiple sub-arrays into multiple vectors, wherein each of the multiple vectors contains one element from each of the multiple sub-arrays;
    sort the multiple vectors by comparing and swapping one or more vector elements among the multiple vectors, wherein said comparing and said swapping comprises performing a set of compare-swap instructions on a first set of one or more registers, and wherein the number of compare-swap instructions in the set of compare-swap instructions is represented as N log N+1, wherein N is a predetermined value; and
    write-back results of said sorting on a second set of one or more registers.

13. The computer program product of claim 12, wherein said sorting comprises sorting the multiple vectors via an odd-even network or a bitonic network.

14. The computer program product of claim 12, wherein the program instructions further cause the computing device to:
    select a sub-array size.

15. A system comprising:
    a memory; and
    at least one processor coupled to the memory and configured for:
    splitting an input array into multiple sub-arrays across multiple processing elements;
    merging the multiple sub-arrays into multiple vectors, wherein each of the multiple vectors contains one element from each of the multiple sub-arrays;
    sorting the multiple vectors by comparing and swapping one or more vector elements among the multiple vectors, wherein said comparing and said swapping comprises performing a set of compare-swap instructions on a first set of one or more registers, and wherein the number of compare-swap instructions in the set of compare-swap instructions is represented as N log N+1, wherein N is a predetermined value; and writing-back results of said sorting on a second set of one or more registers.

16. A method comprising:

selecting a desired sub-array size based on one or more parameters;

splitting an input array into multiple sub-arrays of the selected size across multiple simple instruction, multiple data (SIMD) lanes;

merging the multiple simple instruction, multiple data (SIMD) lanes into multiple vectors, wherein each of the multiple vectors contains one element from each of the multiple sub-arrays;

sorting the multiple vectors by performing a set of compare-swap instructions, applied to the multiple vectors, on a first set of one or more registers, wherein the number of compare-swap instructions in the set of compare-swap instructions is represented as N log N+1, wherein N is a predetermined value; and writing-back results of said sorting on a second set of one or more registers;

wherein said selecting, said splitting, said merging, said sorting, and said writing-back are carried out by at least one computing device.

17. The method of claim 16, wherein said sorting comprises sorting the multiple vectors via an odd-even network.

18. The method of claim 17, comprising:

applying the odd-even network directly across the multiple vectors.

19. The method of claim 16, wherein said sorting comprises sorting the multiple vectors via a bitonic network.

20. The method of claim 19, comprising:

applying the bitonic network directly across the multiple vectors.

* * * * *